Sept. 7, 1965  H. W. MOORE  3,204,739

SHAFT STOP MECHANISM

Filed July 9, 1962

INVENTOR.
HARRY W. MOORE

BY *Dyberg & Dyberg*

HIS ATTORNEYS

United States Patent Office 3,204,739
Patented Sept. 7, 1965

3,204,739
SHAFT STOP MECHANISM
Harry W. Moore, 5051 Kittridge Road, Dayton, Ohio
Filed July 9, 1962, Ser. No. 208,300
6 Claims. (Cl. 192—139)

This invention relates to a shaft stop mechanism and has as an object the provision of an improved shaft stop mechanism for arresting rotation of a shaft at a predetermined angular position.

Another object of this invention is to provide an improved shaft stop mechanism in which the rotation of a shaft will be gradually arrested.

Still another object of this invention is to provide improved mechanism for arresting rotation of a shaft regardless of the direction of rotation thereof.

Other objects and advantages reside in the construction of parts, the combination thereof, the method of manufacture and the mode of operation, as will become more apparent from the following description.

Referring to the drawing.

Figure 1:
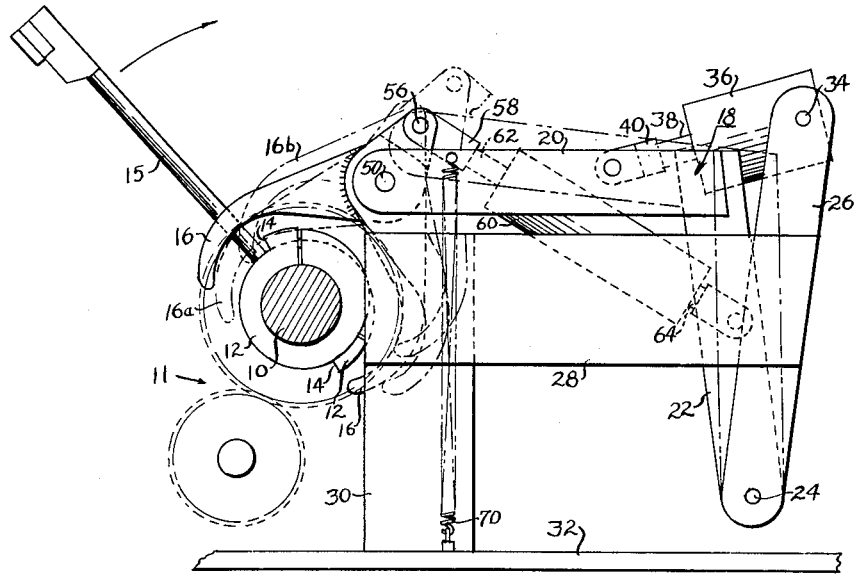
FIGURE 1 is a side elevational view of an embodiment of a shaft stop mechanism made in accordance with this invention operably associated with a shaft which is shown in transverse cross-section.

Referring to the drawing in greater detail, a shaft stop mechanism made in accordance with this invention is shown as used in association with a driven shaft 10 adapted to rotate about an axis passing longitudinally therethrough. The shaft 10, for example, could be used to rotate a flyer mechanism used in coil winding machines and a stop mechanism made in accordance with this invention has been successfully used therefor. However, it will be apparent from the ensuing description that the shaft 10 can be used in a variety of industrial or commercial applications. The shaft 10 can be driven by any of several known drive mechanisms. For this reason, only a simple gear drive mechanism 11 is diagrammatically shown in FIGURES 1 and 2.

Fixedly mounted on the shaft 10 for rotation therewith are a pair of cam-shaped abutment members 12 having outer peripheries of gradually increasing radius terminating in a pair of abutment surfaces 14 projecting substantially radially from the axis of rotation of the shaft 10. The two abutment members 12 are placed side by side on the shaft 10 and in an opposed fashion such that the two abutment surfaces 14 are opposed with respect to the direction of rotation of the shaft 10. The abutment surfaces 14 are illustrated as being on a common diameter passing through the shaft 10. One abutment surface 14 is used in stopping clockwise rotation of the shaft 10, as viewed in FIGURE 1, while the other is used in stopping counterclockwise rotation. The surfaces 14 are on a common diameter in the particular embodiment disclosed so that rotation of the shaft 10 will be stopped in the same angular position regardless of its initial direction of rotation. Thus, the shaft 10 will always be stopped such that a flyer arm 15 is connected thereto is in the position shown in FIGURE 2. However, it will be apparent that the surfaces 14 could project at an angle one to the other different from 180°.

A stop member comprising a pair of stop arms or jaws 16 is pivotally mounted adjacent the shaft 10 upon a pivotal stop support member 18 illustrated as comprising a pair of parallel L-shaped plates, each having a generally horizontal arm portion 20 and a generally vertical arm position 22. The arm portions 20 and 22 may, if desired, be integral or may be attached, as by welding, one to the other. The opposed arm portions 22 are joined by a pivot pin 24 adjacent their lower ends, which also passes through aligned apertures in a pair of opposed, parallel vertical support plates 26. The plates 26 form part of a base structure which further includes a pair of horizontal plates 28, a pair of vertical plates 30 and a generally horizontal base plate 32.

Mounted for pivotal movement adjacent the top of the support plates 26 by a pivot pin 34 passing through aligned apertures therein is an air cylinder 36 having a piston rod 38 projecting from the end thereof opposite the pin 34. The rod 38 is connected by a clevis 40 and a pivot pin 42 to the opposed arm portions 20 of the pivotal support member 18. The air cylinder 36 may be of the conventional piston and cylinder type provided with a restrictor to form a damper. As apparent, the cylinder 36 provides a second pivotal support point for the support member 18 and, at the same time, will permit the support member 18 to pivot about the pin 24 through a small arc. The shape of the base member formed by the members 26, 28, 30 and 32 is not critical. Importantly, a suitable fixed pivot point such as that designated 24 must be provided adjacent the shaft 10 providing a pivotal support for the support member 18. Also, a suitable fixed support must be provided for the air cylinder or damper 36 to provide a second support for the support member 18 and, further, to permit the member 18 to pivot through a restricted arc about an axis passing through the pin 24.

Figure 3:
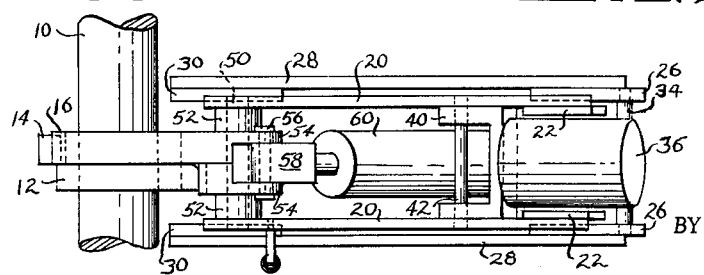
FIGURE 3 is a plan view with the parts in the position shown in FIGURE 2.

The stop jaws or arms 16 are placed side by side upon a pivot pin 50 passing therethrough and through aligned apertures at the outer or free ends of the arm portions 20. As shown in FIGURE 3, a pair of sleeves 52 encircling the pivot pin 50 position the members 16 in a fixed position intermediate the arm portions 20. The upper ends of the arms or jaws 16 are of reduced thickness to provide opposed flanges 54 forming a clevis receiving a pin 56 for pivotal attachment of a link 58 thereto. The link 58 forms part of a stop positioning member which comprises an adjustable arm including a compound air actuator 60 having a first piston rod 62 projecting from one end thereof connected to the link 58 and a second piston rod 64 projecting from the other end thereof connected to a link 66. A pivot pin 68 pivotally connects the link 66 to the opposed arm portions 22.

The adjustable arm incorporating the compound air actuator 60 is used to pivot the stop arms 16 relative to the support member 18, thereby positioning the stop members 16 relative to the abutment members 12 on the shaft 10. When the mechanism is at rest, the pivoted support member 18 is positioned as shown in FIGURE 1. In this position, the piston rod 38 projects outwardly from the end of the air cylinder 36; the piston rod 64 is drawn within the actuator 60 while the rod 62 is projected outwardly therefrom. The arms 16 diverge outwardly from their common pivot and curve inwardly toward one another at their free ends, which form stop portions adapted to be engaged by the abutment surfaces 14. In the position shown in FIGURE 1, the two arms are symmetrical about an imaginary line passing through the center of the axis of rotation of the shaft 10 and their common axis of rotation passing through the center of the pivot pin 50. Thus, when the mechanism is at rest, the free ends or stop portions of the arms 16 straddle the abutment members 12 on the shaft 10.

The operation of the aforedescribed mechanism is as follows. When the arms 16 straddle the members 12 as described above, the shaft 10 can rotate without obstruction from the mechanism described herein. Assuming the shaft 10 to be rotating in a clockwise direction as viewed in FIGURE 1, rotation of the shaft 10 may be arrested by energization of the actuator 60 to project the piston rod 64 therefrom. This will cause the stop member, comprising the two arms 16, to pivot in a counterclockwise direction about the pivot pin 50 as viewed in FIGURE 1. Such pivotal movement causes the arms 16 to be pivoted into the position shown by the dotted lines 16a in FIGURE 1. Note that the free end of the arm 16 to the left in FIGURE 1 is thereby positioned closely adjacent the shaft 10 in the path of movement of the abutment surface 14 on that abutment member 12 which is uppermost in FIGURE 3.

Continued rotation of the shaft 10 causes the last mentioned abutment surface 14 to engage the free end of the last mentioned arm 16. For obvious reasons, it is assumed here that the power drive supplied to the shaft 10 has been removed, but that the shaft 10 will have a certain amount of momentum. Accordingly, upon engagement of the last mentioned surface 14 with the last mentioned arm 16, the shaft 10 will tend to impart a clockwise rotation to the arms 16. The air actuator 60 is such as to adopt a fixed position. Accordingly, the arms 16 cannot, at this point, pivot about the pin 50. Rather, the arms 16 and the support member 18 will pivot about the axis passing through the pin 24. Such pivotal movement of the stop member and the support member 18 will continue until such time as the rearward end of the clevis 40 engages the adjacent face of the cylinder 36. The resulting pivotal movement of the stop member and the movable support member 18 is restricted or dampened, however, due to the restrictor within the air cylinder 36. The momentum of the shaft 10 imparted to the members 16 and 18 is, accordingly, gradually dissipated by the air within the cylinder 36 passing through the restrictor.

Thus, the rotation of the shaft 10 is arrested, but without undue shock either to the shaft 10 or to the stop mechanism. The position of the parts after clockwise rotation of the shaft 10 has been completely arrested is shown in full lines in FIGURE 2. This position of the arms 16 is also shown by dotted lines 16b in FIGURE 1. Note in FIGURE 2 that the base of the clevis 40 is in engagement with the air cylinder 36 and that both the piston rods 62 and 64 are projecting outwardly from the air actuator 60.

Rotation of the shaft 10 is a counterclockwise direction, as viewed in FIGURE 1, can be arrested in much the same manner as that described above. In this case, however, the arms 16 are pivoted in a clockwise direction about the pivot pin 50 by withdrawal of the piston rod 62 into its associated cylinder portion of the air actuator 60. Upon such pivotal movement of the arms or jaws 16, the lowermost abutment member 12 will engage the free end of the lowermost arm 16, as viewed in FIGURE 3, again imparting momentum to the arm 16 and the support member 18. Thereupon, the pivotal support member 18 will again tend to rotate in a clockwise direction about an axis passing through the pivot pin 24, such pivotal movement being restricted by the damper 36. Thus, regardless of the direction of rotation of the shaft 10, only one damper 36 is required to cushion the braking or arresting of rotation of the shaft 10.

Figure 2:
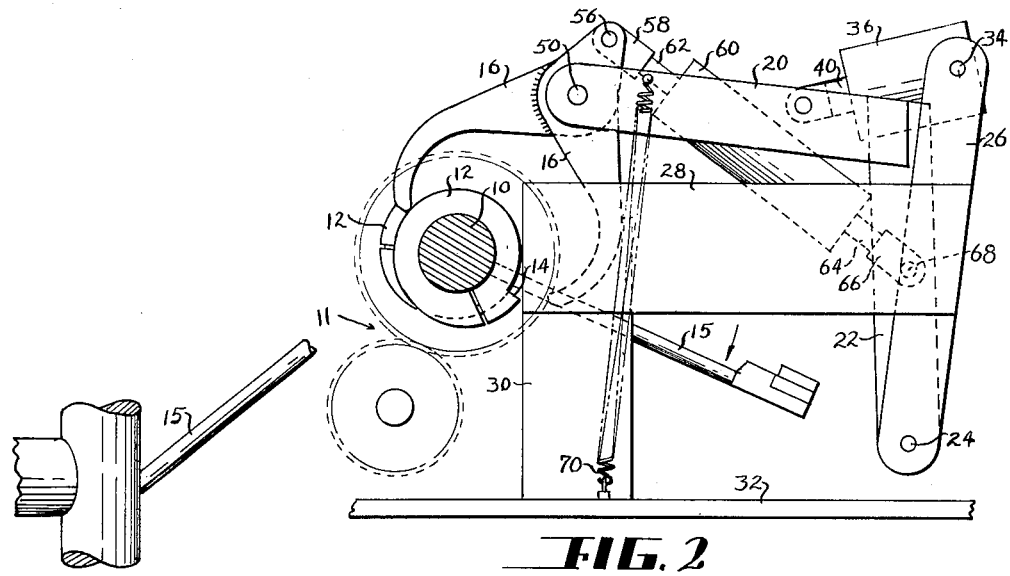
FIGURE 2 is an elevational view similar to FIGURE 1 showing the parts of the mechanism immediately after rotation of the shaft has been completely arrested.

After rotation of the shaft 10 has been arrested, the mechanism may be reset in the following manner. Assuming the parts of the mechanism are as shown in FIGURES 2 and 3, the piston rod 64 is first withdrawn into its adjacent cylinder portion of the air actuator 60; the jaws or arms 16, accordingly, will again be positioned in straddling relation to the abutment means 12 on the shaft 10. A heavy, coiled reset spring 70 connected at its upper end to the pivotal support member 18 and at its lower end to the base plate 32 pivots the support member 18 about the pivot pin 24 in a counterclockwise direction, thus withdrawing the piston rod 38 from its cylinder 36 and returning the support member 18 to the position shown in FIGURE 1. Operation of the mechanism can then be repeated as described above.

The cylinder 36 has been described as a damper, which may be of any conventional type. On the other hand, means (not shown) may be provided to supply air under pressure to the cylinder to force the pivot pin 38 outwardly therefrom. This could serve either of two purposes. First, the reset spring 70 would be rendered unnecessary. More importantly, however, if it should be desired to re-position the shaft 10 once stopped, the cylinder 36 could form the type of actuator in which the piston rod 38 moves by increments controlled by the supply of air thereto. Note that if the piston rod 38 should be projected outwardly from the cylinder 36 while the air actuator 60 remains in the position shown in FIGURE 2, the support member 18 and the arms 16 would then be moved in a counterclockwise direction about the pivot pin 24. Such counterclockwise movement of the arms 16 engaged with the abutment members 12 would cause the shaft 10 to rotate in a counterclockwise direction. Thus, not only could the mechanism described herein be used as a stop mechanism providing a cushioned stop for the shaft 10, it could also be used to re-position the shaft 10.

While the actuator 60 and the cylinder 36 have been described herein as being operative by air, it is apparent that hydraulic actuators could be used in their stead. Also, no attempt has been made herein to fully disclose the structure of the members 36 and 60, since such are conventional. The various air lines used in operation of these devices have been removed to more clearly illustrate the remaining structure.

The arms 16 have been described above as being symmetrical with respect to an imaginary line passing through the axis of rotation of the shaft 10 and the pivot pin 50. Because of this relationship and because the opposed abutment surfaces 14 are on a common diameter of the shaft 10, rotation of the shaft 10 will be completely arrested with the shaft 10 in the same angular position regardless of the initial direction of rotation thereof. It should be noted that the cam profile of the abutment members 14 makes it unnecessary to accurately time the actuation of the member 60. For the same reason, the arms 16 can approach the abutment members from angles other than that illustrated.

All of the axes of rotation of the various members herein are shown as being mutually parallel. Such parallelism of the various axes of rotation is not essential. However, it is desirable that the axis of rotation of the members 16 about the pivot pin 50 is parallel to the axis of rotation of the shaft 10 so long as the arms 16 are symmetrically disposed and it is desired to arrest the rotation of the shaft 10 in the same angular position regardless of its direction of rotation.

Although the presently preferred embodiment of the device has been described, it will be understood that within the purview of this invention various changes may be made in the form, details, proportion and arrangement of parts, the combination thereof and mode of operation, which generally states consist in a device capable of carrying out the objects set forth, as disclosed and defined in the appended claims.

Having thus described my invention, I claim:

1. Mechanism for stopping rotation of a shaft provided with an abutment member having a surface projecting substantially radially from its axis of rotation, comprising: a base fixed relative to the shaft; a support member having one end pivotally connected to said base; a damper pivotally connected at one end thereof to said base and pivotally connected at its other end to an intermediate portion of said support member; a stop arm pivotally connected to the other end of said support member; an adjustable arm having one of its ends pivotally connected to said support member and the other of its ends pivotally connected to said stop arm at a point spaced from the point whereat the stop arm is connected to the support arm; said adjustable arm being adjustable from a first position in which said one end of said stop arm is held spaced from said abutment member to a second position in which said stop arm is pivoted into position for engagement with the radially projecting surface thereon, whereby said stop arm and said support member are pivoted relative to said base upon engagement of said surface with said stop arm to the extent permitted by said damper.

2. Mechanism for stopping rotation of a shaft adapted to rotate about a first axis, comprising: abutment means fixedly connected to said shaft; a base member; a support member pivotally connected to said base member; a stop member mounted for rotation on said support member about a second axis parallel to said first axis; stop positioning means connected to both said support member and said stop member adapted to pivot said stop member into a first position spaced from said abutment means and into a second position wherein said stop member is engaged by said abutment means, said stop member and said support member being pivoted relative to said base member due to continued rotation of said shaft upon engagement of the abutment with said stop member; and damper means connected to said support member resisting and limiting pivotal movement thereof.

3. The mechanism of claim 2 wherein said stop positioning means comprises a compound actuator having piston rods projecting from opposite ends thereof and a pair of links connected respectively to said piston rods, one of said links being pivotally connected to said stop member and the other of said links being pivotally connected to said support member.

4. The combination of claim 2 wherein said damper means comprises an air cylinder interconnecting said support member and said base member.

5. Mechanism for arresting rotation of a shaft adapted to rotate about a first axis, comprising: abutment means fixedly connected to said shaft including a pair of opposed, substantially radially disposed abutment surfaces; a base member; a support member pivotally connected to said base member about a predetermined axis; a stop member mounted for rotation on said support member about a second axis parallel to said first axis, said stop member including a pair of arms having spaced stop portions; stop positioning means connected to said stop member adapted to pivot said stop member and hold said stop member in a first position wherein the stop portions of said arms straddle the abutment means, in a second position by rotation of said stop member in one direction wherein the stop portion of one of said arms is positioned for engagement by one of said abutment surfaces, and in a third position by rotation of said stop member in an opposite direction wherein the stop portion of the other of said arms is positioned for engagement by the other of said abutment surfaces, said stop member and said support member being pivoted relative to said base member about said predetermined axis in the same direction due to continued rotation of said shaft upon engagement of either of said abutment surfaces with said stop member; and damper means connected to said support member resisting and limiting pivotal movement thereof.

6. In combination: a rotatable shaft; abutment means fixedly mounted on said shaft including a pair of opposed abutment surfaces; a support member; means pivotally mounting said support member for pivotal movement about a predetermined axis; a pair of stop arms pivotally mounted on said support member, said arms having spaced stop portions; stop positioning means connected to at least one of said stop arms and adapted to pivot said arms and hold said arms in a first position wherein the stop portions of said arms straddle the abutment means, in a second position by rotation of said arms in one direction wherein the stop portion of one of said arms is positioned for engagement by one of said abutment surfaces, and in a third position by rotation of said arms in an opposite direction wherein the stop portion of the other of said arms is positioned for engagement by the other of said abutment surfaces, said arms and said support member being pivoted about said predetermined axis in the same direction due to continued rotation of said shaft upon engagement of either of said abutment surfaces with either of said arms; and damper means connected to said support member resisting and limiting pivotal movement thereof.

References Cited by the Examiner

UNITED STATES PATENTS

| | | | |
|---|---|---|---|
| 1,636,324 | 7/27 | Reed | 192—149 |
| 2,350,975 | 6/44 | Rodder et al. | 192—149 |
| 2,727,613 | 12/55 | Radkowski | 192—138 |
| 3,103,269 | 9/63 | Bernard | 192—149 |

DAVID J. WILLIAMOWSKY, *Primary Examiner.*